United States Patent

Dron et al.

[11] 4,100,392
[45] Jul. 11, 1978

[54] ASSEMBLY OF A MAGNET AND A POLE PIECE

[75] Inventors: Sylvain Maurice Dron, Meudon-la-Foret; Gerard Maurice Gaspard Evrard, Livry-Gargan, both of France

[73] Assignee: Societe Nationale d'Etude et de Construction de Moteurs d'Aviation (SNECMA), Paris, France

[21] Appl. No.: 703,304

[22] Filed: Jul. 7, 1976

[30] Foreign Application Priority Data

Jul. 10, 1975 [FR] France .................. 75 22454

[51] Int. Cl.² .................................. B23K 15/00
[52] U.S. Cl. .................... 219/121 EM; 219/137 R; 335/302; 29/607; 29/DIG. 24
[58] Field of Search .............. 219/121 LM, 121 EM, 219/121 EB; 335/302, 303, 294, 285, 288; 29/607, DIG. 24

[56] References Cited

U.S. PATENT DOCUMENTS

| | | | |
|---|---|---|---|
| 2,392,592 | 1/1946 | Iseki | 29/607 |
| 2,714,829 | 8/1955 | Clark | 335/302 X |
| 2,719,267 | 9/1955 | Kunz et al. | 335/302 X |
| 3,059,156 | 10/1962 | Moriya | 335/301 |
| 3,186,052 | 6/1965 | Bobrow | 335/302 X |
| 3,407,371 | 10/1968 | Gosma | 335/302 X |
| 3,513,912 | 5/1970 | Boop | 335/303 X |
| 3,949,186 | 4/1976 | Nakayama et al. | 219/121 EM X |

*Primary Examiner*—J. V. Truhe
*Assistant Examiner*—Mark Paschall
*Attorney, Agent, or Firm*—Watson, Cole, Grindle & Watson

[57] ABSTRACT

A pole piece is secured to a magnet by means of a connecting element running perpendicular to the common plane of the confronting surfaces of the magnet and the pole piece. The connecting element is welded to the pole piece and/or the magnet by electron bombardment or by means of a laser so as to cause minimum disturbance to the structure of the magnetic materials.

3 Claims, 4 Drawing Figures

U.S. Patent     July 11, 1978     4,100,392
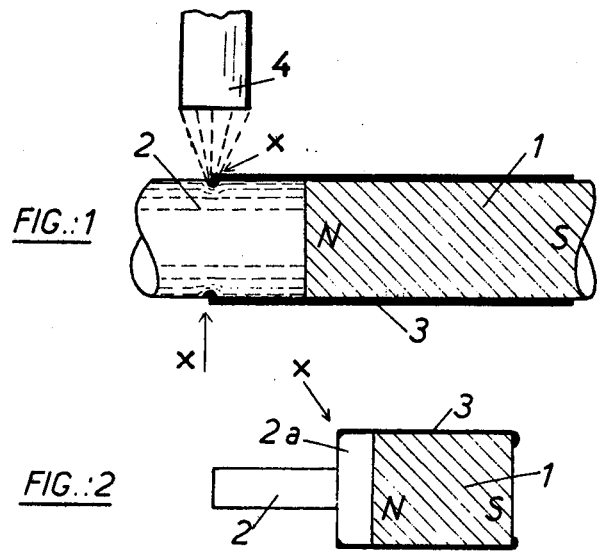
FIG.:1
FIG.:2
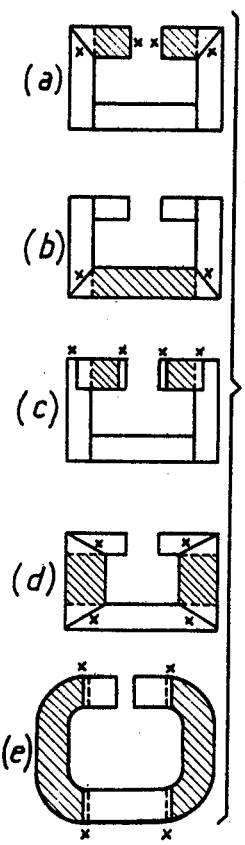
FIG.:3
(a)
(b)
(c)
(d)
(e)
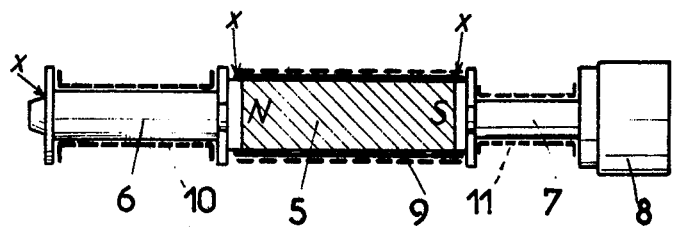
FIG.:4

ASSEMBLY OF A MAGNET AND A POLE PIECE

This invention, which concerns magnets and magnetic circuits, relates more specifically to the assembly of a magnet and a pole piece.

It should be understood that the materials for the magnets under consideraton have a structure which is obtained by precipitation from a molten bath and their optimum properties are due to a long heat treatment at a temperature within the range 550° C. to 650° C. No change in the structure of the magnet is produced below 550° C. and the magnets remain anisotropic below that temperature. Between 550° C. and 700° C. the magnetic properties are changed and they disappear when the Curie Point is reached (at 860° C.). They can be restored only by a prolonged heat treatment at 540° C.

When the magnets are to be fixed to pole pieces one can consider the use of any of the usual methods for all other metallic or quasi-metallic materials which cause no harmful effects, in other words which are external to the components to be assembled. Examples of these methods are adhesion, brazing with soft brass alloys, purely mechanical assembly, brazing with hard brass alloys and ordinary welding. As the assembly under consideration has to provide a certain degree of mechanical resistance the first two processes are not suitable. Pure mechanical assembly always introduces some inter-iron gaps into the magnetic circuit, particularly after a certain period of use, and tends to be over bulky. Brazing with brass alloys and welding necessitate a delicate and troublesome subsequent operation of magnetic restoration.

In fact brazing with hard brass alloys which is done at temperatures in the region of 600° C. disintegrates a part of the magnetic structure of the magnet which part therefore acts as an additional inter-iron gap if restoration is not carried out. Ordinary welding presents the same inconvenience as brazing in this respect and additionally causes a change in the basic material of the magnet because of the mixture, in the liquid phase of the weld, of the material of the magnet with the material of the pole piece.

There is also known in the field of welding a welding process for zirconium alloy based materials making use of electron bombardment under vacuum to effect a welded joint with the assistance of a localized momentary pressure which is released as soon as the joint is made, as is disclosed in U.S. Pat. application Ser. No. 561252, filed on June 28th 1966 in the name of Fujio R. Itoh, which does not mention its application to the forming of magnetic circuits.

The invention aims to avoid the inconveniences mentioned above including any operation for the restoring of magnetism after the joining of a magnet to a pole piece.

According to one aspect of the invention, there is provided a method for joining a magnet to a pole piece with the respective flat faces thereof confronting each other comprising the steps of, connecting the magnet to the pole piece by mechanical coupling means and applying energy from a distance to the coupling means, whereby the retention forces at the common plane of said faces remain after termination of said application of the energy from a distance.

According to another aspect of the invention, there is provided an assembly comprising a magnet, a pole piece and at least one coupling element retaining the magnet and the pole piece in abutment one against the other, the coupling element being welded to at least one of the magnets and the pole piece by application of energy from a distance on to the surface thereof to obtain a weld of a very localized nature which in practice does not interfere with the magnetic structure of the magnetic material, the said coupling element remaining in position and keeping its grip after said application of energy is terminated.

The application of energy from a distance may be effected by electron bombardment under vacuum or by a laser beam. It should be understood that the material of the magnet need not be a metal. It may, for example, be a ferrite.

The invention will be better explained and understood by referring to the following description of embodiments thereof with reference to the accompanying drawing, in which:

FIG. 1 shows schematically an assembly in accordance with the invention;

FIG. 2 shows a modification of the embodiment illustrated in FIG. 1,

FIG. 3 shows the application of the invention to various magnetic circuits, and

FIG. 4 shows the application of the invention to a magnetic type of speedometer.

It is known that on machines using magnets, it is often necessary to join pole pieces of soft iron to the magnets for many reasons such as to assist in mounting or to constitute a more complex magnetic circuit.

FIG. 1 illustrates the simple case when an assembly of a cylindrical magnet 1 and a cylindrical pole piece 2 of the same diameter is to be made. The confronting surfaces are initially trued-up and then brought into abutment one against the other in such a manner that the gap therebetween is of very low reluctance. In the present embodiments of the invention, the two pieces 1 and 2, put end to end, are slid or otherwise fitted within a thin coupling tube 3 of a non-magnetic material, preferably a metal, which embraces the two pieces while exerting a radial grip on them or, in other words, is an interference fit on both pieces. With this tube in position, very localized energy is applied from a distance on to the point $x$ by means of a device 4 (shown schematically), for example a laser or a source of electron bombardment. Specifically, the penetration of the resulting weld melt into the thickness of the pole piece is only some hundredths of a mm. At the same time, the welding process used entails a deterioration of the crystalline structure of only a minute volume of the magnetic material. The disturbance thus occasioned in the magnetic circuit causes no inconvenience since the material of the pole piece does not usually operate at saturation point.

FIG. 2 shows a variation in which the pole piece 2, which has a smaller diameter than the magnet 1, is provided with a suitable shoe 2a of the same diameter as the magnet 1 so that the assembly procedure of FIG. 1 can be used.

FIG. 3 shows five magnetic circuits (a, b, c, d, e) of different shapes. In each case the magnet is shown hatched and the pole pieces are left white, energy from a distance being applied at the points $x$. With each of the magnetic circuits shown, instead of using a coupling tube, a thin non-magnetic sheet is laid flat on the magnetic circuit and welded to it for example by electron bombardment. In certain magnetic circuit configurations it is possible to use a thin magnetic sheet for this purpose.

Finally FIG. 4 shows the application of the invention to a speedometer consisting of a magnet 5 provided with a pair of pole pieces 6 and 7, the pole pieces 7 being joined to an end piece 8. The pole pieces 6 and 7 have shoes of the same diameter as the magnet 5 and are welded to it by electron bombardment. Aluminium sheaths 9, 10, 11 surround the magnet 5 and pole pieces 6 and 7. The illustrated assembly constitutes a source of magnetomotive force in the speedometer. In use this source is arranged in series in a magnetic circuit which includes a toothed wheel connected to a motor shaft. The passage of the toothed wheel past the source of magnetomotive force produces variations in the reluctance of the magnetic circuit, thereby generating a periodic electromotive force in a coil which is influenced by the magnetic flux passing through the circuit. An indication of the rotational speed of the shaft is deduced from this electromotive force.

We claim:

1. A method for joining a magnet to a pole piece with the respective flat faces thereof confronting each other, comprising the steps of truing-up said flat faces, abutting the magnet and the pole piece by their trued flat faces, connecting the magnet to the pole piece by a mechanical constricting tube member made of a nonmagnetic material to exert a constrictional circumferential stress both on the magnet and the pole piece, and applying energy from a distance to the constricting member to obtain a weld at a location outside the magnet and only between the constricting member and the pole piece, whereby the retention forces at the common plane of said faces remain after terminaton of said application of energy.

2. A method of joining a magnet to a pole piece according to claim 1, in which the pole piece and the magnet have the same cross-section and said coupling member has the form of a sleeve which holds the pole piece and the magnet together, wherein the application of energy at a distance is effected in the end region of the sleeve and is limited to obtain a weld of a very localized nature, the coupling sleeve remaining in position and maintaining its grip after said application of energy is terminated.

3. A method of joining a magnet to a pole piece according to claim 1, in which the magnet and the pole piece to be assembled have different cross-sections, further comprising a preliminary step in which the pole piece is provided with an intermediate part of the same pole piece material which has an end face identical to the magnet face to register therewith, said end face of the intermediate part and said magnet face being used as the faces to be trued and assembled.

* * * * *